United States Patent

Kosuge et al.

[11] Patent Number: 5,874,163
[45] Date of Patent: Feb. 23, 1999

[54] LAMINATED POLYESTER FILM TO BE LAMINATED ON METAL PLATE

[75] Inventors: Masahiko Kosuge; Hideshi Kurihara, both of Matsuyama, Japan

[73] Assignee: Teijin Limited, Osaka, Japan

[21] Appl. No.: 872,939

[22] Filed: Jun. 11, 1997

Related U.S. Application Data

[63] Continuation of Ser. No. 492,011, filed as PCT/JP94/02039, Dec. 5, 1994, abandoned.

[30] Foreign Application Priority Data

Dec. 6, 1993 [JP] Japan .................................. 5-305226
Mar. 28, 1994 [JP] Japan .................................. 6-057093

[51] Int. Cl.$^6$ .............................. B32B 7/02; B32B 15/08; B32B 27/08; B32B 27/36
[52] U.S. Cl. ..................... 428/212; 428/35.7; 428/35.8; 428/323; 428/458; 428/480; 428/910; 156/308.2; 264/319; 264/320
[58] Field of Search .............................. 428/335.7, 358, 428/323, 343, 344, 346, 349, 457, 458, 480, 910; 525/437, 444, 448; 528/274, 275, 276, 383, 302, 305, 308, 308.1, 308.6, 308.7; 156/306.6, 308.2, 196, 212

[56] References Cited

U.S. PATENT DOCUMENTS

| | | | |
|---|---|---|---|
| 3,884,870 | 5/1975 | Dodson et al. | 260/40 R |
| 4,041,206 | 8/1977 | Tsunashima et al. | 428/409 |
| 4,362,775 | 12/1982 | Yabe et al. | 428/213 |
| 4,559,257 | 12/1985 | Nilsson | 428/152 |
| 4,735,835 | 4/1988 | Taira et al. | 428/35 |
| 4,957,820 | 9/1990 | Heyes et al. | 428/623 |
| 5,243,022 | 9/1993 | Kim et al. | 528/308.8 |
| 5,286,836 | 2/1994 | Park et al. | 528/275 |
| 5,292,471 | 3/1994 | Ito et al. | 264/171 |
| 5,300,335 | 4/1994 | Miyazawa et al. | 428/35.8 |
| 5,384,354 | 1/1995 | Hasegawa et al. | 524/539 |
| 5,424,121 | 6/1995 | Murakami et al. | 428/337 |

FOREIGN PATENT DOCUMENTS

| | | |
|---|---|---|
| 0 580404 | 1/1994 | European Pat. Off. . |
| 1-022530 | 1/1989 | Japan . |
| 1-192545 | 8/1989 | Japan . |
| 1-192546 | 8/1989 | Japan . |
| 2-057339 | 2/1990 | Japan . |
| 5-339348 | 12/1993 | Japan . |
| 6-039979 | 2/1994 | Japan . |
| 2055687 | 3/1981 | United Kingdom . |
| 2242159 | 9/1991 | United Kingdom . |

OTHER PUBLICATIONS

Database WPI, Derwent Publ. Ltd., London, GB; Abstract of Jap. Laid–Open Publ. No. 4–249546 (Sep. 4, 1992).
Database WPI, Derwent Publ. Ltd., London, GB; Abstract of Jap. Laid–Open Pat. Publ. No. 5–339348 (Dec. 21, 1993).
Database WPI, Derwent Publ. Ltd., London, GB; Abstract of Jap. Laid–Open Pat. Publ. No. 5–320377 (Dec. 3, 1993).
Database WPI, Derwent Publ. Ltd., London, GB; Abstract of Jap. Laid–Open Pat. Publ. No. 5–186612 (Jul. 27, 1993).

*Primary Examiner*—Vivian Chen
*Attorney, Agent, or Firm*—Sherman and Shalloway

[57] ABSTRACT

A laminated polyester film comprises: a first layer formed of a first aromatic copolymer having a terminal carboxyl group centration of 10 to 35 equivalent/$10^6$ g; and a second layer of a molten blend having a terminal carboxyl group concentration of 40 to 80 equivalent/$10^6$ g, which comprises a second aromatic polyester containing ethylene terephthalate as a main recurring unit and a third aromatic polyester containing tetramethylene terephthalate as a main recurring unit. The laminated polyester film exhibits excellent moldability when a metal plate laminated therewith is deep drawn, and is excellent in impact resistance and flavor retaining property after can making.

26 Claims, No Drawings ic # LAMINATED POLYESTER FILM TO BE LAMINATED ON METAL PLATE

This application is a continuation of application Ser. No. 08/492,011, filed Jul. 19, 1995, abandoned, which is a 371 of PCT/JP94/02039, filed December 5, 1994.

TECHNICAL FIELD

This invention relates to a laminated polyester film to be laminated on a metal plate. More specifically, it relates to a laminated polyester film to be laminated on a metal plate, which exhibits excellent moldability in can-making processing such as drawing of a metal plate laminated with the film, and which enables the production of metal cans such as beverage cans and food cans which are excellent in heat resistance, resistance to retort treatment, flavor retaining property, impact resistance, rustproof property and the like.

PRIOR ART

Inner and outer surfaces of metal cans generally have coatings for protection against corrosion. For simplifying the manufacturing step, improving sanitary conditions and preventing environmental pollution, there have been recently developed methods of imparting rustproof properties to metal cans without using any organic solvent. One of the methods is to coat metal cans with a film of a thermoplastic resin. That is, studies have been being made of a method in which a plate of tin-plated steel, tin-free steel or aluminum is laminated with a film of a thermoplastic resin and the resultant laminate is drawn to make cans. Attempts have been made to use a polyolefin film or a polyamide film as the above film of a thermoplastic resin, but not all of moldability, heat resistance, flavor retaining property and impact resistance are satisfied.

On the other hand, a polyester film, or a polyethylene terephthalate film in particular, is drawing attention as one having well-balanced properties, and several proposals have been made to use it as a base film as follows.

(A) A metal plate is laminated with a biaxially oriented polyethylene terephthalate film through an adhesive layer of a polyester having a low melting point, and the resultant laminate is used as a material for making cans (see Japanese Laid-open Patent Publication Nos. Sho 56-10,451 and Hei 1-192,546).

(B) A metal plate is laminated with a film of an aromatic polyester having amorphous nature or very low crystallinity, and the resultant laminate is used as a material for making cans (see Japanese Laid-open Patent Publication Nos. Hei 1-192,545 and Hei 2-57,339).

(C) A metal plate is laminated with a heat-set, biaxially oriented polyethylene terephthalate film having a low orientation degree, and the resultant laminate is used as a material for making cans (see Japanese Laid-open Patent Publication No. Sho 64-22,530).

As for (A), the biaxially oriented polyethylene terephthalate film is excellent in heat resistance and flavor retaining property, while it is poor in moldability so that it is whitened (causes fine cracks) or broken during can-making processing which entails large deformation.

As for (B), the film used is an amorphous or very low crystalline aromatic polyester film and therefore has excellent moldability, while the film is poor in flavor retaining property and is liable to embrittle when printing is effected on the film, cans are post-treated for retort treatment, or cans are stored for a long period of time, and the embrittled film is liable to break due to an external impact.

As for (C), the laminate is to produce an effect in a region between (A) and (B), while the film has not yet attained a low orientation degree which can be applied to can-making processing. Further, even if the laminate is moldable in a region where the degree of deformation is small, the film is liable to embrittle when printing is thereafter effected or when the can is subjected to retort treatment for sterilizing canned contents, and the embrittled film is liable to break due to an external impact, as discussed for (B).

Further, Japanese Laid-open Patent Publication No. Hei 5-339,348 proposes a polyester film to be laminated with a metal plate and processed thereafter, which is formed from a copolyester having a specific melting point, a specific glass transition temperature and a specific concentration of a terminal carboxyl group. Japanese Laid-open Patent Publication No.Hei 6-39,979/1994 proposes a polyester film to be laminated on a metal plate and processed thereafter, which is a laminate of a copolyester having a specific melting point and a specific glass transition temperature. However, when cans using these films are used, for example, as beverage containers, and in particular, when cans are filled with contents such as mineral water, the influence of the polyester film on taste and flavor differs according to kind of the content. Therefore, a further improvement of polyester film to be laminated on a metal plate for mold-processing is desired.

DISCLOSURE OF THE INVENTION

An object of the present invention is to provide a novel laminated polyester film to be laminated on a metal plate.

Another object of the present invention is to provide a laminated polyester film to be laminated on a metal plate, which has an improved property of retaining the flavor of its contents and improved impact resistance after can making while it retains excellent moldability, heat resistance and resistance to retort treatment of a polyester film.

Other objects and advantages of the present invention will be apparent from the following description.

According to the present invention, the above objects and advantages of the present invention can be attained by a laminated polyester film to be laminated on a metal plate, which comprises:

(A) a first layer formed of a first aromatic copolyester (a1) which contains terephthalic acid as a main dicarboxylic acid component and ethylene glycol as a main glycol component, and which has (a2) a melting point in the range of 210° to 245° C., (a3) a glass transition temperature of at least 60° C., (a4) a terminal carboxyl group concentration in the range of 10 to 35 equivalent/$10^6$ g, and (a5) an intrinsic viscosity in the range of 0.52 to 0.8 dl/g, and (B) a second layer formed of a molten blend having a terminal carboxyl group concentration in the range of 40 to 80 equivalent/$10^6$ g, which comprises 60 to 99% by weight of a second aromatic polyester (b1) which contains ethylene terephthalate as a main recurring unit, and which has (b2) a melting point in the range of 210° to 255° C., and (b3) an intrinsic viscosity in the range of 0.52 to 0.8 dl/g and 1 to 40% by weight of a third aromatic polyester (c1) which contains tetramethylene terephthalate as a main recurring unit, and which has (c2) a melting point in the range of 180° to 223° C., and (c3) an intrinsic viscosity in the range of 0.52 to 1.65 dl/g, and (C) which exhibits excellent moldability when a metal plate laminated therewith is deep-drawn.

As described above, the laminated polyester film of the present invention comprises the first layer (A) and the second layer (B).

The first layer is formed of the first aromatic copolyester which contains terephthalic acid as a main dicarboxylic acid component and ethylene glycol as a main glycol component.

Illustrative examples of a dicarboxylic acid other than the terephthalic acid constituting the first aromatic copolyester include aromatic dicarboxylic acids such as isophthalic acid, phthalic acid and naphthalene dicarboxylic acid; aliphatic dicarboxylic acids such as adipic acid, azelaic acid, sebacic acid and decanedicarboxylic acid; alicyclic dicarboxylic acids such as cyclohexanedicarboxylic acid; and the like.

Similarly, illustrative examples of a diol other than ethylene glycol constituting the first aromatic copolyester include aliphatic diols represented by $HO-(CH_2)_n-OH$ (n=3 to 10) such as butane diol and hexane diol; branched glycols represented by $HO-CH_2-C(R)_2-CH_2-OH$ (R=alkyl group having 1 to 4 carbon atoms) such as neopentyl glycol; diethylene glycols (DEG); triethylene glycols (TEG); alicyclic diols such as cyclohexane dimethanol; polyoxyalkylene glycols such as polyethylene glycol and polypropylene glycol; and the like. They may be used alone or in combination of two or more.

The first aromatic copolyester preferably contains an ethylene isophthalate unit in addition to an ethylene terephthalate unit.

The first aromatic copolyester has a melting point in the range of 210° to 245° C. When the melting point is below 210° C., heat resistance deteriorates. When the melting point is above 245° C., moldability is greatly impaired. The melting point of the first aromatic copolyester is preferably in the range of 215° to 235° C.

The first aromatic copolyester has a glass transition temperature of at least 60° C. When the glass transition temperature is below 60° C., satisfactory flavor retaining property cannot be ensured. Since such a copolyester is a copolyester having a high glass transition temperature, an isophthalic acid-copolymerized polyethylene terephthalate is particularly preferred.

The glass transition temperature of the first aromatic copolyester is preferably at least 70° C.

Since the melting point and glass transition temperature of the first aromatic copolyester depend on kinds and amounts of copolymer components, kinds and amounts of the copolymer components are experientially selected to satisfy the above values.

The measurements of the melting point and glass transition temperature of the copolyester are carried out by a method for obtaining a melting peak and a glass transition temperature peak at a temperature elevation rate of 20° C./minute, using a Du Pont Instruments 910 DSC. The amount of a sample is approximately 20 mg.

Further, the first aromatic copolyester has a terminal carboxyl group concentration of 10 to 35 equivalent/$10^6$ g. When the concentration is above 35 equivalent/$10^6$ g, the property of retaining the flavor of can's liquid contents such as a beverage or food, which come in contact with the copolyester inner layer of the can deteriorates significantly. This is considered to be caused by strong interaction between the terminal carboxyl group and the components of the liquid contents which destroys the balance of the components.

The first aromatic copolyester has a terminal carboxyl group concentration preferably in the range of 10 to 30 equivalent/$10^6$ g, more preferably in the range of 10 to 25 equivalent/$10^6$ g.

The first aromatic copolyester having a terminal carboxyl group concentration in the above range can be produced by an ester exchange method (DMT method) or esterification method (Direct Polymerization method) for producing copolyesters in which the following special reaction conditions are employed. For instance, the first aromatic copolyester can be produced by using a metal compound used for the ester exchange method or esterification method, such as a compound of Mg, Mn, Zn, Ca, Li, Ti, Ge or the like in a smaller amount than usual and setting a polycondensation reaction temperature milder (lower) than usual to perform a polycondensation reaction.

The metal compound (catalyst) used in the above polycondensation reaction is not particularly limited, but is selected preferably from an antimony compound, titanium compound, germanium compound and the like. Among these, particularly preferred is a germanium compound from a view point of flavor retaining property.

Preferred examples of the antimony compound include antimony trioxide, antimony acetate and the like. Preferred examples of the titanium compound include titanium tetrabuthoxide, titanium acetate and the like. Preferred examples of the germanium compound include (a) amorphous germanium oxide, (b) fine crystalline germanium oxide, (c) a solution prepared by dissolving germanium oxide in glycol in the presence of an alkaline metal, alkaline earth metal or a compound of any one of these compounds, (d) a solution of germanium oxide in water, (e) germanium tetrachloride, and (f) a solution of tetraethoxy germanium in glycol.

The first aromatic copolyester has an intrinsic viscosity in the range of 0.52 to 0.8 dl/g, preferably 0.54 to 0.75 dl/g, more preferably 0.57 to 0.71 dl/g.

The first aromatic copolyester may contain inert fine particles as required. The inert fine particles have an average particle diameter preferably in the range of 0.05 to 0.6 $\mu$m, and may be preferably contained in an amount of 0.01 to 1% by weight based on the first aromatic copolyester. The inert fine particle is preferably spherical with preferred examples thereof including spherical silica, spherical titanium oxide, spherical zirconium, and spherical silicone resin particle.

The second layer (B) constituting the laminated polyester film of the present invention is formed of a molten blend of the second aromatic polyester and the third aromatic polyester.

The second aromatic polyester contains ethylene terephthalate as a main recurring unit.

Examples of the aromatic dicarboxylic acids other than terephthalic acid and the diol other than ethylene glycol constituting the second aromatic polyester are the same as those provided for the first aromatic copolyester.

The second aromatic polyester may contain at least one dicarboxylic acid component selected from the group consisting of aromatic dicarboxylic acids other than terephthalic acid, aliphatic dicarboxylic acids and alicyclic dicarboxylic acids in an amount of 2 to 19 mol % based on the total of all dicarboxylic acid components and may also contain at least one glycol selected from the group consisting of aliphatic glycols other than ethylene glycol and alicyclic glycols in an amount of 2 to 19 mol % based on the total of all glycol components.

The second aromatic polyester has a melting point in the range of 210° to 255° C. When the melting point is below 210° C., heat resistance deteriorates, and when the melting point is above 225° C., moldability is greatly impaired due to too high crystallinity of the polymer.

The melting point of the second aromatic polyester is preferably in the range of 220° to 245° C.

The second aromatic polyester has an intrinsic viscosity of 0.52 to 0.8 dl/g, preferably 0.54 to 0.75 dl/g, more preferably 0.57 to 0.71 dl/g.

The second aromatic polyester has a glass transition temperature preferably in the range of at least 60° C., more preferably in the range of at least 70° C.

The third aromatic polyester which is the other component constituting the second layer (B), contains tetramethylene terephthalate as a main recurring unit.

Examples of the aromatic dicarboxylic acid other than terephthalic acid constituting the third aromatic polyester are the same as those provided for the first aromatic copolyester. Examples of the diol other than tetramethylene glycol include aliphatic diols represented by $HO-(CH_2)_m-OH$ (m=2, 3, 5 to 10) such as ethylene glycol and hexane diol, branched glycols represented by $HO-CH_2-C(R)_2-CH_2-OH$ (R=alkyl group having 1 to 4 carbon atoms) such as neopentyl glycol, diethylene glycols (DEG), triethylene glycols (TEG), alicyclic diols such as cyclohexane dimethanol, polyoxyalkylene glycols such as polyethylene glycol and polypropylene glycol, and the like. They may be used alone or in combination of two or more.

A preferred example of the third aromatic polyester is polytetramethylene terephthalate homopolymer.

The third aromatic polyester has a melting point in the range of 180° to 223° C. When the melting point is below 180° C., heat resistance deteriorates significantly.

The melting point of the third aromatic polyester is preferably in the range of 195° to 223° C.

The third aromatic polyester has an intrinsic viscosity in the range of 0.52 to 1.65 dl/g, preferably 0.54 to 1.55 dl/g, more preferably 0.57 to 1.50 dl/g.

The molten blend of the second layer (B) contains 60 to 99% by weight of the second aromatic polyester and 1 to 40% by weight of the third aromatic polyester based on the total of the second aromatic polyester and the third aromatic polyester.

When the third aromatic polyester is contained in an amount of less than 1% by weight and the second aromatic polyester in an amount of more than 99% by weight, impact resistance at low temperatures cannot be improved. When the third aromatic polyester is contained in an amount of more than 40% by weight and the second aromatic polyester in an amount of less than 60% by weight, the heat resistance of the film of the second layer (B) decreases and its impact resistance is insufficient.

The difference between the melting point of the second aromatic polyester and that of the third aromatic polyester is preferably less than 4° C. This greatly facilitates preparation of the molten blend and provides a desired molten blend with ease.

The molten blend preferably contains 90 to 60% by weight of the second aromatic polyester and 10 to 40% by weight of the third aromatic polyester.

The molten blend has a terminal carboxyl group concentration in the range of 40 to 80 equivalent/$10^6$ g. When the terminal carboxyl group concentration is below 40 equivalent/$10^6$ g, its adhesion to a metal plate is poor. When the terminal carboxyl group concentration is above 80 equivalent/$10^6$ g, thermal decomposition of the polyester proceeds drastically, and, undesirably, stability of the film-forming process is deteriorated and deteriorated foreign matters are included into the film.

The terminal carboxyl group concentration of the molten blend is preferably in the range of 43 to 75 equivalent/$10^6$ g, more preferably 45 to 70 equivalent/$10^6$ g.

The terminal carboxyl group concentration of the molten blend having a terminal carboxyl group concentration in the above range can be attained by the terminal carboxyl group concentration of either one of the second aromatic polyester and the third aromatic polyester.

The polyester having a relatively high concentration of a terminal carboxyl group can be produced by an ester exchange method (DMT method) or esterification method (Direct Polymerization method), which are conducted under the following special reaction conditions. For instance, the polyester can be produced by (1) a method for obtaining a polyester using a metal compound used for ester exchange or esterification, such as a compound of Mg, Mn, Zn, Ca, Li, Ti, Ge or the like, in a larger amount than usual, (2) a method for promoting a polycondensation reaction while a temperature higher than usual and/or a duration longer than usual are retained in the latter stage of the polycondensation reaction, and (3) a method for copolymerizing a monomer which is liable to undergo thermal decomposition, such as an aliphatic carboxylic acid having 4 to 12 carbon atoms or an aliphatic glycol. Also, a method for blending a predetermined amount of a so-called re-processed polymer having a relatively high concentration of terminal carboxyl group in which thermal decomposition proceeds relatively well may be adopted.

Further, a method for reacting an acid anhydride such as phthalic anhydride or succinic anhydride with the second aromatic polyester and the third aromatic polyester may be adopted. In this case, when an acid anhydride is added, for example, to such an extent that the terminal carboxyl group concentration exceeds 80 equivalent/$10^6$ g, thermal stability of the second aromatic polyester and the third aromatic polyester is, undesirably, greatly lowered due to the unreacted acid anhydride.

The metal compound (catalyst) used in the above polycondensation reaction is not particularly limited, but preferably selected from an antimony compound, a titanium compound, a germanium compound and the like. Among these, the germanium compound is particularly preferred for the second aromatic polyester from a view point of flavor retaining property.

Preferred antimony compounds include antimony trioxide, antimony acetate and the like. Preferred titanium compounds include titanium tetrabuthoxide, titanium acetate and the like. Preferred germanium compounds include (a) amorphous germanium oxide, (b) fine crystalline germanium oxide, (c) a solution prepared by dissolving germanium oxide in glycol in the presence of an alkaline metal, alkaline earth metal or a compound of any one of these compounds, (d) a solution of germanium oxide in water, (e) germanium tetraoxide, (f) a solution of tetraethoxy germanium in glycol, and the like.

At least one of the second aromatic polyester and the third aromatic polyester which constitute the second layer (B) preferably contains inert fine particles in an amount of 0.03 to 0.5% by weight based on the molten blend to improve handling property (winding property) in the film-forming process.

The inert fine particles, that is, a lubricant, may be organic or inorganic, while it is preferably inorganic. Examples of the inorganic lubricant include silica, alumina, titanium dioxide, calcium carbonate, barium sulfate and the like, and examples of the organic lubricant include a cross-linked polystyrene particle, silicone resin particle and the like. Any of these lubricants have an average particle diameter preferably in the range of 0.8 to 2.5 μm. When the average particle diameter is above 2.5 μm, a pinhole starting from a coarse particle (having a particle diameter of 10 μm or more, for example) is generated in that portion of the film which is deformed or the film is likely to break in some cases, when a metal plate laminated with the film is deep-drawn to make a can.

In view of the prevention of occurrence of pinholes, the lubricant is preferably a monodisperse lubricant having an average particle diameter of 0.8 to 2.5 µm and a particle diameter ratio (long diameter/short diameter) of 1.0 to 1.2. Specific examples of such a lubricant include spherical silica, spherical titanium dioxide, spherical zirconium, spherical silicone resin particles and the like.

The above-described first aromatic polyester, second aromatic polyester and third aromatic polyester used in the present invention may contain other additives such as an oxidant, thermal stabilizer, viscosity modifier, plasticizer, adhesion improving agent, nucleating agent, ultraviolet absorber, antistatic agent and the like.

The laminated polyester film of the present invention has a structure of a laminate composed of the first layer (A) and the second layer (B). This laminate-structured film can be produced by a method in which the first aromatic polyester and a molten blend of the second aromatic polyester and the third aromatic polyester forming respective layers are separately molten, co-extruded and laminate-fused before solidified, and then the laminate is biaxially oriented and heat-set, or a method in which each polyester for a respective layer is separately molten and extruded to prepare films, and then the films are laminate-fused before or after stretched. The heat-set temperature can be selected from the range of 150° to 220° C., preferably 160° to 200° C. when the stretched film is heat set.

In the laminated polyester film of the present invention, the first layer (A) has a refractive index in the thickness direction preferably in the range of 1.505 to 1.550, more preferably in the range of more than 1.510 and 1.540 or less. When the refractive index is too low, the film is insufficient in moldability, and when the refractive index is too high, the film may have a nearly amorphous structure and may be poor in heat resistance.

The laminated polyester film of the present invention has a thickness preferably in the range of 6 to 75 µm, more preferably 10 to 75 µm, particularly preferably 15 to 50 µm. When the thickness is below 6 µm, the polyester film is liable to break in processing, and when the thickness is above 75 µm, the film has excess in quality which is economically disadvantageous.

The thickness of the second layer (B) (adhesive layer) differs according to the surface roughness of the metal plate. In the case of an ordinary smooth surface, it is sufficient that the film has a thickness of at least 2 µm to achieve stable adhesion. Particularly, when importance is attached to resistance to retort treatment and rustproof property, the film preferably has a thickness of at least 12 µm. Therefore, the ratio (TA/TB) of the thickness of the first layer (A), TA, to the thickness of the second layer (B), TB, is preferably in the range of 0.02 to 0.67, more preferably 0.04 to 0.43, particularly preferably 0.04 to 0.25. Specifically, in the case of a 25 µm thick polyester film, the thickness of the second layer (B) (adhesive layer) is set to 15 to 24.5 µm, preferably 17.5 to 24 µm, more preferably 20 to 24 µm.

As the metal plate to be laminated with the laminated polyester film of the present invention, particularly the metal plate for making cans, tin-plated steel, tin-free steel and aluminum plates are suitable. Lamination of the polyester film onto the metal plate can be conducted by the following method.

The metal plate is heated to a temperature equal to, or higher than a melting point of the film, and laminated on the second layer (B) (adhesive layer) of the laminated polyester film. The resultant laminate is cooled so that the surface portion (thin layer portion) of the film which is in contact with the metal plate is brought into an amorphous state and intimately bonded to the metal plate.

Further, in the laminated polyester film of the present invention, the first layer (A) is generally in direct contact with the second layer (B), but an additional layer may be provided between the first layer (A) and the second layer (B) as required. For instance, another thin adhesive layer, undercoating layer or electrical discharge-treated layer may be provided between the first layer (A) and the second layer (B). An additional layer may be laminated on the other side of the second layer (B) opposite to the side in contact with the first layer (A) as required.

When the second layer (B) of the laminated polyester film is formed of the second aromatic polyester only, adhesion to the metal plate deteriorates greatly and, when the second layer (B) is formed of the third aromatic polyester only, the resulting film becomes soft and viscous when it is laminated with a metal plate, with the result of poor workability. In either case, good laminating property cannot be obtained by using only one of the aromatic polyesters.

Further, when the polyester film is formed of the first layer (A) only, the film is insufficient in adhesion and impact resistance, while when the polyester film is formed of the second layer (B) only, the film is poor in flavor retaining property. Therefore, both cases are inappropriate.

EXAMPLES

The present invention will be further explained hereinafter with reference to the following Examples.

Examples 1 to 7 and Comparative Examples 1 to 6

A polyethylene terephthalate (having an intrinsic viscosity of 0.64 dl/g and containing 0.3% by weight of titanium dioxide having an average particle diameter of 0.3 µm) prepared by copolymerizing a component shown in Table 1 in the presence of a polycondensation catalyst shown in Table 1 according to an EI method and a molten blend prepared by blending the second aromatic polyester and the third aromatic polyester shown in Table 1 were individually dried, molten and co-extruded through adjacent dies according to conventional methods to laminate and fuse the extrudates, and the laminate was solidified by quenching to form an unstretched laminated film in which the polyethylene terephthalate formed a first layer (A) and the molten blend formed a second layer (B) (adhesive layer).

Then, the above unstretched film was stretched in the longitudinal direction at a stretch ratio of 3.0 at 100° C. and then stretched in the transverse direction at a stretch ratio of 3.2 by elevating temperature from 100° C. to 150° C., and the stretched film was heat-set at 200° C. to give a biaxially oriented film.

The thus obtained film had a thickness of 25 µm. The first layer (A) had a thickness of 5 µm and the second layer (B) had a thickness of 20 µm.

Comparative Example 1 is a film in which the second layer (B) (adhesive layer) is formed of the second aromatic polyester alone, and Comparative Example 2 is a film in which the second layer (B) (adhesive layer) is formed of the third aromatic polyester alone.

Comparative Example 7

A single-layered film which was formed of the first layer (A) of Example 1 alone was prepared. The thus obtained film had a thickness of 25 µm.

TABLE 1

| | First layer (A) | | | | | Terminal carboxyl group concentration |
|---|---|---|---|---|---|---|
| | Copolymer component | | | | | |
| | Composition | mol % | Tm (°C.) | Tg (°C.) | Polycondensation catalyst* | (Equivalent/$10^6$ g) |
| Comp. Ex.1 | IA | 12 | 229 | 73 | Ge | 25 |
| Comp. Ex.2 | IA | 12 | 229 | 73 | " | 25 |
| Ex.1 | IA | 12 | 229 | 73 | " | 25 |
| Ex.2 | IA | 12 | 229 | 73 | " | 25 |
| Ex.3 | IA | 12 | 229 | 73 | " | 25 |
| Ex.4 | IA | 12 | 229 | 73 | " | 25 |
| Ex.5 | AA | 9 | 240 | 60 | " | 25 |
| Ex.6 | IA | 12 | 229 | 73 | Sb | 25 |
| Ex.7 | IA | 12 | 229 | 73 | " | 25 |
| Comp. Ex.3 | IA | 12 | 229 | 73 | " | 40 |
| Comp. Ex.4 | IA | 12 | 229 | 73 | " | 25 |
| Comp. Ex.5 | IA | 3 | 251 | 75 | " | 25 |
| Comp. Ex.6 | IA | 12 | 229 | 73 | " | 25 |
| Comp. Ex.7 | IA | 12 | 229 | 73 | " | 25 |

| | Second layer (B) | | | | | | | | | | | Terminal carboxyl group concentration |
|---|---|---|---|---|---|---|---|---|---|---|---|---|
| | Second Aromatic polyester | | | | | | Third Aromatic polyester | | | | | |
| | Basic component | Copolymer component | | Tm (°C.) | Tg (°C.) | Polycondensation catalyst* | Weight (%) | Basic component | Copolymer component | | Tm (°C.) | Weight (%) | (equivalent/$10^6$ g) |
| | | Composition | mol % | | | | | | Composition | mol % | | | |
| Comp. Ex.1 | PET | IA | 20 | 210 | 71 | Ge | 100 | — | — | — | — | — | 40 |
| Comp. Ex.2 | — | — | — | — | — | " | — | PBT | — | — | 223 | 100 | 50 |
| Ex.1 | PET | IA | 12 | 229 | 73 | " | 70 | PBT | — | — | 223 | 30 | 43 |
| Ex.2 | PET | IA | 12 | 229 | 73 | " | 70 | PBT | IA | 5 | 214 | 30 | 43 |
| Ex.3 | PET | SA | 9 | 240 | 60 | " | 70 | PBT | — | — | 223 | 30 | 43 |
| Ex.4 | PET | IA | 20 | 210 | 71 | " | 70 | PBT | — | — | 223 | 30 | 50 |
| Ex.5 | PET | IA | 12 | 229 | 73 | Sb | 70 | PBT | — | — | 223 | 30 | 43 |
| Ex.6 | PET | IA | 12 | 229 | 73 | Ge | 70 | PET | SA | 25 | 197 | 30 | 43 |
| Ex.7 | PET | IA | 3 | 251 | 75 | " | 70 | PBT | IA | 15 | 198 | 30 | 43 |
| Comp. Ex.3 | PET | IA | 12 | 229 | 73 | " | 70 | PBT | — | — | 223 | 30 | 43 |
| Comp. Ex.4 | PET | IA | 12 | 229 | 73 | " | 70 | PBT | — | — | 223 | 30 | 25 |
| Comp. Ex.5 | PET | IA | 12 | 229 | 73 | " | 70 | PBT | — | — | 223 | 30 | 43 |
| Comp. Ex.6 | PBT | IA | 15 | 198 | 32 | " | 70 | PBT | — | — | 223 | 30 | 43 |
| Comp. Ex.7 | — | — | — | — | — | " | — | — | — | — | — | — | — |

*Ge: Amorphous germanium oxide, Sb: $Sb_2O_3$

In Table 1, IA stands for isophthalic acid, AA adipic acid, SA sebacic acid, PET polyethylene terephthalate, and PBT polybutylene terephthalate. Further, Tg represents a glass transition temperature and Tm a melting point. Terminal carboxyl group concentrations were obtained in accordance with A. CONIX method (Makromol. Chem. 26, 226(1958)).

Each of the fourteen films obtained in Examples 1 to 7 and Comparative Examples 1 to 7 was laminated with a 0.25 mm thick tin-free steel plate heated at 230° to 260° C. and at the same time fused together by pressing them with a roll heated at 90° to 150° C. from the opposite side of the metal plate. Then, the resulting laminates were cooled with water to obtain one surface- or both surfaces- coated steel plates.

These coated steel plates were evaluated for their laminating property on the basis of the following standards.

(1) Laminating property
  (A) standards for air bubbles and wrinkles
  ○: No bubbles and wrinkles could be seen.
  Δ: A few bubbles and wrinkles could be seen in a length of 10m.
  X: Many bubbles and wrinkles could be seen.
  (B) standards for heat shrinkage
  ○: Heat shrinkage percentage was less than 2%.
  Δ: Heat shrinkage percentage was 2% or more and less than 5%.
  X: Heat shrinkage percentage was 5% or more.

The tin-free steel plates laminated with the above-described polyester films were cut into disk-shaped pieces having a diameter of 150 mm, and the pieces were deep-drawn at four stages with a drawing die and a punch to produce side-seamless containers having a diameter of 55 mm (to be abbreviated as "cans" hereinafter).

The above cans were observed and tested, and evaluated on the basis of the following standards.

(2) Deep-draw processability-1
  ○: A laminate could be processed without causing any defect on a film, and the film showed no opacification or breakage.
  Δ: Whitening of the film was observed at upper portion of the metal can.
  X: Breakage was observed in some portions of the film.

(3) Deep-draw processability-2
  ○: A laminate was deep-drawn without causing any defect on a film, and when the inner film-coated surface was subjected to a rustproof test (hereinafter referred to as ERV test) (1% NaCl aqueous solution was charged in the can, an electrode was inserted therein, the can body was used as an anode, and when a voltage of 6 V was applied, an electric current value was measured), the current value was 0.1 mA or less.

X: A film visually showed no defects, while the measured current value was more than 0.1 mA in ERV test. When the part through which the electric current was passed was magnified for observation, pinhole-like cracks starting at coarse lubricant particles were observed in the sample film.

(4) Adhesion

Excellently deep-drawn cans were filled with water to full and subjected to a retort treatment for 90 minutes at 120° C. in a steam sterilizer. Thereafter, the cans were stored at 50° C. for 3 months. A cross was cut on the thus obtained cans to observe the adhesion of the film.

○: The film was firmly adhered to the steel plate and did not peel off even when a cross-cut was given.

Δ: Adhesion slightly deteriorated by a cross-cutting.

X: The film peeled off by a cross-cutting.

(5) Rust-proof property

Excellently deep-drawn cans were filled with an aqueous 5% NaCl solution to full and stored at 50° C. for 7 days. Rust generation was visually observed for ten of the cans as one group. The results were evaluated as follows.

○: Generation of rust was not observed in all of the ten cans.

Δ: Generation of rust was observed in 1 to 5 of the cans.

X: Generation of rust was observed in 6 or more of the cans.

(6) Impact resistance

Excellently deep-drawn cans were filled with water to full, and cooled to 10° C. Ten water-filled cans of the same laminate as one group were dropped from a height of 30 cm on a polyvinyl chloride tiled floor. Then, the cans were subjected to an ERV test. The results were evaluated as follows.

○: All of the ten cans showed a current value of 0.1 mA or less.

Δ: 1 to 5 of the cans showed a current value of more than 0.1 mA.

X: 6 or more of the cans showed a current of more than 0.1 mA, or cracks in the film were observed immediately after dropping.

(7) Resistance to embrittlement under heat

Excellently deep-drawn cans were heated at 200° C. for 5 minutes and thereafter evaluated for impact resistance in the same manner as described in (6) above.

○: All of the ten cans showed a current value of 0.1 mA or less.

Δ: 1 to 5 of the cans showed a current value of more than 0.1 mA.

X: 6 or more of the cans showed a current value of more than 0.1 mA, or cracks in the film are observed after heating at 200° C. for 5 minutes.

(8) Resistance to retort treatment

Excellently deep-drawn cans were filled with water to full, subjected to a retort treatment at 120° C. for an hour in a steam sterilizer, and thereafter stored at 50° C. for 30 days. Then, ten water-filled cans of the same laminate as one group were dropped from a height of 50 cm on a polyvinyl chloride tiled floor. Then, the cans were subjected to an ERV test.

○: All of the ten cans showed a current value of 0.1 mA or less.

Δ: 1 to 5 of the cans showed a current value of more than 0.1 mA.

X: 6 or more of the cans showed a current of more than 0.1 mA, or cracks in the film are observed immediately after dropping.

(9) Flavor retaining property

Excellently deep-drawn cans were each filled with 10 bottles of mineral water and tightly closed. The cans were stored at 37° C. for 4 months and opened, and the beverage was sensory-tested for a change in taste and flavor.

⊚: No change in taste and flavor

○: Slight changes in taste and flavor were found in 1 or 2 of the cans.

Δ: Small changes in taste and flavor were found in 3 to 4 of the cans.

X: Changes in taste and flavor were found in 5 or more of the cans.

The results of the above nine evaluations are shown in Table 2.

TABLE 2

| | Laminating property | | Deep draw processability – 1 | Deep draw processability – 2 | Adhesion | Rust-proof property | Impact resistance | Resistance to embrittlement under heat | Resistance to retort treatment | Flavor retaining property |
|---|---|---|---|---|---|---|---|---|---|---|
| | (A) | (B) | | | | | | | | |
| Comp. Ex.1 | ○ | ○ | ○ | X | ○ | ○ | X | X | Δ | ○ |
| Comp. Ex.2 | X | X | — | — | — | — | — | — | — | — |
| Ex.1 | ○ | ○ | ○ | ○ | ○ | ○ | ○ | ○ | ○ | ⊚ |
| Ex.2 | ○ | ○ | ○ | ○ | ○ | ○ | ○ | ○ | ○ | ⊚ |
| Ex.3 | ○ | ○ | ○ | ○ | ○ | ○ | ○ | ○ | ○ | ⊚ |
| Ex.4 | ○ | ○ | ○ | ○ | ○ | ○ | ○ | ○ | ○ | ⊚ |
| Ex.5 | ○ | ○ | ○ | ○ | ○ | ○ | ○ | ○ | ○ | ○ |
| Ex.6 | ○ | ○ | ○ | ○ | ○ | ○ | ○ | ○ | ○ | ○ |
| Ex.7 | ○ | ○ | ○ | ○ | ○ | ○ | ○ | ○ | ○ | ⊚ |

| | Laminating property | | Deep draw processability – 1 | Deep draw processability – 2 | Adhesion | Rust-proof property | Impact resistance | Resistance to embrittlement | Resistance to retort treatment | Flavor retaining property |
|---|---|---|---|---|---|---|---|---|---|---|
| | (A) | (B) | | | | | | | | |
| Comp. Ex.3 | ○ | ○ | ○ | ○ | ○ | ○ | ○ | ○ | ○ | X |

TABLE 2-continued

| | | | | | | | | | | |
|---|---|---|---|---|---|---|---|---|---|---|
| Comp. Ex.4 | ○ | Δ | ○ | X | Δ | Δ | Δ | ○ | ○ | ○ |
| Comp. Ex.5 | ○ | ○ | Δ | X | ○ | ○ | Δ | ○ | ○ | ○ |
| Comp. Ex.6 | ○ | ○ | ○ | ○ | ○ | Δ | Δ | X | Δ | ○ |
| Comp. Ex.7 | ○ | ○ | ○ | X | Δ | Δ | X | Δ | Δ | ○ |

Table 2 clearly shows that the cans using the polyester film of the present invention are excellent in laminating property, deep-draw processability, resistance to embrittlement under heat, retort resistance, rustproof property and impact resistance, and in particular, in flavor retaining property and adhesion.

We claim:

1. A laminated polyester film to be laminated on a metal plate, which comprises:
    (A) a first layer formed of a first aromatic copolyester (a1) which contains terephthalic acid as a main dicarboxylic acid component and ethylene glycol as a main glycol component, and which has (a2) a melting point in the range of 210° to 245° C., (a3) a glass transition temperature of at least 60° C., (a4) a terminal carboxyl group concentration in the range of 10 to 35 equivalent/$10^6$ g, and (a5) an intrinsic viscosity in the range of 0.52 to 0.8 dl/g, and
    (B) a second layer formed of a molten blend having a terminal carboxyl group concentration in the range of 40 to 80 equivalent/$10^6$ g, which comprises 60 to 99% by weight of a second aromatic polyester (b1) which contains ethylene terephthalate as a main recurring unit, and which has (b2) a melting point in the range of 210° to 255° C., and (b3) an intrinsic viscosity in the range of 0.52 to 0.8 dl/g and 1 to 40% by weight of a third aromatic polyester (c1) which contains tetramethylene terephthalate as a main recurring unit, and which has (c2) a melting point in the range of 180° to 223° C., and (c3) an intrinsic viscosity in the range of 0.52 to 1.65 dl/g.

2. The laminated polyester film of claim 1, wherein the first aromatic copolyester contains ethylene isophthalate units.

3. The laminated polyester film of claim 1, wherein the first aromatic copolyester has a melting point in the range of 215° to 235° C.

4. The laminated polyester film of claim 1, wherein the first aromatic copolyester has a glass transition temperature of at least 70° C.

5. The laminated polyester film of claim 1, wherein the first aromatic copolyester has a terminal carboxyl group concentration in the range of 10 to 30 equivalent/$10^6$ g.

6. The laminated polyester film of claim 1, wherein the first aromatic copolyester has an intrinsic viscosity in the range of 0.54 to 0.75 dl/g.

7. The laminated polyester film of claim 1, wherein the first aromatic copolyester is produced in the presence of a germanium compound as a polycondensation catalyst.

8. The laminated polyester film of claim 1, wherein the first aromatic copolyester contains 0.01 to 1% by weight of inert fine particles having an average particle diameter of 0.05 to 0.6 μm.

9. The laminated polyester film of claim 8, wherein the inert fine particles are spherical.

10. The laminated polyester film of claim 1, wherein the second aromatic polyester contains at least one dicarboxylic acid component selected from the group consisting of aromatic dicarboxylic acids other than terephthalic acid, aliphatic dicarboxylic acids and alicyclic dicarboxylic acids in an amount of 2 to 19 mol % based on the total of all dicarboxylic acid components.

11. The laminated polyester film of claim 1, wherein the second aromatic polyester contains at least one glycol selected from the group consisting of aliphatic glycols other than ethylene glycol and alicyclic glycols in an amount of 2 to 19 mol % based on the total of all glycol components.

12. The laminated polyester film of claim 1, wherein the second aromatic polyester has a melting point in the range of 220° to 245° C.

13. The laminated polyester film of claim 1, wherein the second aromatic polyester has an intrinsic viscosity in the range of 0.54 to 0.75 dl/g.

14. The laminated polyester film of claim 1, wherein the second aromatic polyester is produced in the presence of a germanium compound as a polycondensation catalyst.

15. The laminated polyester film of claim 1, wherein the third aromatic polyester has a melting point of 195° C. to 223° C.

16. The laminated polyester film of claim 1, wherein the difference of melting point between the second polyester and the third aromatic polyester is 4° C. or less.

17. The laminated polyester film of claim 1, wherein the third aromatic polyester has an intrinsic viscosity in the range of 0.54 to 1.55 dl/g.

18. The laminated polyester film of claim 1, wherein the molten blend comprises 90 to 60% by weight of the second aromatic polyester and 10 to 40% by weight of the third aromatic polyester.

19. The laminated polyester film of claim 1, wherein the molten blend has a terminal carboxyl group concentration in the range of 43 to 75 equivalent/$10^6$ g.

20. The laminated polyester film of claim 1, wherein the molten blend has a terminal carboxyl group concentration in the range of 45 to 70 equivalent/$10^6$ g.

21. The laminated polyester film of claim 1, wherein the molten blend contains 0.03 to 0.5% by weight of inert fine particles having an average particle diameter of 0.8 to 2.5 μm.

22. The laminated polyester film of claim 1, wherein a ratio of a thickness of the first layer (A) to a thickness of the second layer (B) is in the range of 0.02 to 0.67.

23. The laminated polyester film of claim 1 which has a total thickness of 6 to 75 μm.

24. The laminated polyester film of claim 1 which shows a value of 0.1 mA or less when an iron plate laminated with the laminated polyester film is tested for deep-draw processability-2.

25. A method for making metal cans, comprising:
    laminating a metal plate with a laminated polyester film, said laminated polyester film comprising
    (A) a first layer formed of a first aromatic copolyester which contains terephthalic acid as a main dicarboxylic acid component and ethylene glycol as a main glycol component, and which has a melting point in the range of 210° to 245° C., a glass transition temperature of at least 60° C., a terminal carboxyl group concentration in the range of 10 to 35 equivalents/$10^6$ g, and an intrinsic viscosity in the range of 0.52 to 0.8 dl/g, and (B) a second layer formed of a melt blend having a terminal carboxyl group concentration in the range of 40 to 80 equivalents/$10^6$ g, which comprises
- 60 to 99% by weight of a second aromatic polyester which contains ethylene terephthalate as a main recurring unit, and which has a melting point in the range of 210° to 255° C. and an intrinsic viscosity in the range of 0.52 to 0.8 dl/g, and
- 1 to 40% by weight of a third aromatic polyester which contains tetramethylene terephthalate as a main recurring unit, and which has a melting point in the range of 180° to 223° C., and an intrinsic viscosity in the range of 0.52 to 1.65 dl/g, said second layer (B) of said laminated polyester film contacting said metal plate;

deep-drawing, with a drawing die and a punch, said metal plate laminated with said laminated polyester film to form side-seamless cans.

26. The method of claim 25, wherein said laminated polyester film is a biaxially oriented film.

* * * * *